United States Patent
Fujinami et al.

(10) Patent No.: US 10,196,023 B2
(45) Date of Patent: Feb. 5, 2019

(54) VEHICLE COLLISION DETECTION SYSTEM

(71) Applicant: TOYOTA JIDOSHA KABUSHIKI KAISHA, Toyota-shi (JP)

(72) Inventors: Takashi Fujinami, Nagoya (JP); Yusuke Mase, Nagoya (JP); Hisashi Hagiwara, Toyota (JP); Jiro Ohachi, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/890,438

(22) Filed: Feb. 7, 2018

(65) Prior Publication Data

US 2018/0229680 A1    Aug. 16, 2018

(30) Foreign Application Priority Data

Feb. 13, 2017    (JP) ................. 2017-023998

(51) Int. Cl.
*B60R 21/0132*    (2006.01)
*B60R 21/00*      (2006.01)
*B60R 21/01*      (2006.01)

(52) U.S. Cl.
CPC .... *B60R 21/0132* (2013.01); *B60R 2021/002* (2013.01); *B60R 2021/0004* (2013.01); *B60R 2021/01013* (2013.01); *B60R 2021/01272* (2013.01); *B60R 2021/01322* (2013.01)

(58) Field of Classification Search
CPC ........ B60R 21/0132; B60R 2021/0004; B60R 2021/002; B60R 2021/01013; B60R 2021/01272; B60R 2021/01322

USPC .......................................... 701/45, 300, 301
See application file for complete search history.

(56) References Cited

U.S. PATENT DOCUMENTS

| | | | | | |
|---|---|---|---|---|---|
| 5,253,050 | A | * | 10/1993 | Karasudani | B60R 1/00 348/118 |
| 5,326,133 | A | * | 7/1994 | Breed | B60R 19/483 180/274 |
| 5,431,441 | A | * | 7/1995 | Okano | B60R 21/0132 280/735 |
| 5,513,109 | A | * | 4/1996 | Fujishima | B60R 21/01332 180/274 |

(Continued)

FOREIGN PATENT DOCUMENTS

| | | |
|---|---|---|
| JP | 09-99803 | 4/1997 |
| JP | 2001-030871 | 2/2001 |

(Continued)

*Primary Examiner* — Angelina Shudy
(74) *Attorney, Agent, or Firm* — Oblon, McClelland, Maier & Neustadt, L.L.P.

(57) ABSTRACT

A vehicle collision detection system that includes: a controller that actuates an occupant restraint device in a case in which a collision between a vehicle and an object has been predicted by a collision prediction section, a collision mode has been determined to be an underride mode by a determination section, the object has been determined to be another vehicle by the determination section, and an acceleration detected by a first acceleration sensor is at or above an underride-mode-actuation determination threshold that is lower than a normal-actuation determination threshold for the occupant restraint device.

7 Claims, 8 Drawing Sheets

(56) References Cited

U.S. PATENT DOCUMENTS

| | | | | |
|---|---|---|---|---|
| 5,692,775 A * | 12/1997 | Foo | B60R 21/0133 | 280/735 |
| 5,899,946 A * | 5/1999 | Iyoda | B60R 21/0132 | 180/274 |
| 5,904,730 A * | 5/1999 | Yamazaki | B60R 21/0132 | 180/271 |
| 6,167,335 A * | 12/2000 | Ide | B60R 21/013 | 180/271 |
| 6,170,864 B1 * | 1/2001 | Fujita | B60R 21/013 | 280/735 |
| 6,196,578 B1 * | 3/2001 | Iyoda | B60R 21/013 | 280/735 |
| 6,246,937 B1 * | 6/2001 | Miyaguchi | B60R 21/013 | 280/735 |
| 6,256,564 B1 * | 7/2001 | Miyaguchi | B60R 21/013 | 280/728.1 |
| 6,327,527 B1 * | 12/2001 | Imai | B60R 21/013 | 280/735 |
| 6,347,268 B1 * | 2/2002 | Fujita | B60R 21/013 | 280/735 |
| 6,353,784 B1 * | 3/2002 | Miyaguchi | B60R 21/0133 | 280/728.1 |
| 6,371,515 B1 * | 4/2002 | Fujishima | B60R 21/013 | 180/282 |
| 6,373,147 B1 * | 4/2002 | Miyaguchi | B60R 21/013 | 307/10.1 |
| 6,381,561 B1 * | 4/2002 | Bomar, Jr. | G06Q 99/00 | 702/142 |
| 6,480,772 B1 * | 11/2002 | Ugusa | B60R 21/0132 | 180/271 |
| 6,615,122 B1 * | 9/2003 | Yamashita | B60R 21/013 | 180/271 |
| 6,950,014 B2 | 9/2005 | Rao et al. | | |
| 7,284,769 B2 * | 10/2007 | Breed | B60R 21/0132 | 180/282 |
| 7,635,043 B2 * | 12/2009 | Breed | B60J 10/00 | 180/282 |
| 7,684,914 B2 * | 3/2010 | Hayasaka | B60R 21/0132 | 180/268 |
| 8,095,274 B2 * | 1/2012 | Burkhardtsmaier | B60R 21/01548 | 280/734 |
| 10,073,178 B2 * | 9/2018 | Hara | G01S 17/936 | |
| 2002/0154006 A1 * | 10/2002 | Murphy | B60R 21/0136 | 340/436 |
| 2003/0051530 A1 * | 3/2003 | Eisele | B60R 21/0132 | 73/12.09 |
| 2003/0105569 A1 * | 6/2003 | Roelleke | B60R 21/0132 | 701/45 |
| 2004/0036261 A1 * | 2/2004 | Breed | B60C 11/24 | 280/735 |
| 2004/0102882 A1 * | 5/2004 | Sala | B60R 21/0132 | 701/45 |
| 2004/0107033 A1 * | 6/2004 | Rao | B60R 21/013 | 701/45 |
| 2004/0243294 A1 * | 12/2004 | Miyata | B60R 21/0132 | 701/45 |
| 2006/0162982 A1 * | 7/2006 | Lich | B60R 21/013 | 180/271 |
| 2006/0180376 A1 * | 8/2006 | Kobayashi | B60R 21/01516 | 180/268 |
| 2006/0232052 A1 * | 10/2006 | Breed | B60R 21/013 | 280/735 |
| 2006/0265130 A1 * | 11/2006 | Mattes | B60R 21/0132 | 701/301 |
| 2007/0114767 A1 * | 5/2007 | Miyata | B60R 21/0132 | 280/735 |
| 2011/0035117 A1 * | 2/2011 | Yamada | B60R 21/0132 | 701/45 |
| 2013/0035827 A1 * | 2/2013 | Breed | B60R 21/0132 | 701/45 |

FOREIGN PATENT DOCUMENTS

| | | |
|---|---|---|
| JP | 2001-030873 | 2/2001 |
| JP | 2002-062307 | 2/2002 |
| JP | 2002-062308 | 2/2002 |
| JP | 2005-297732 | 10/2005 |
| JP | 2015-009774 | 1/2015 |

* cited by examiner

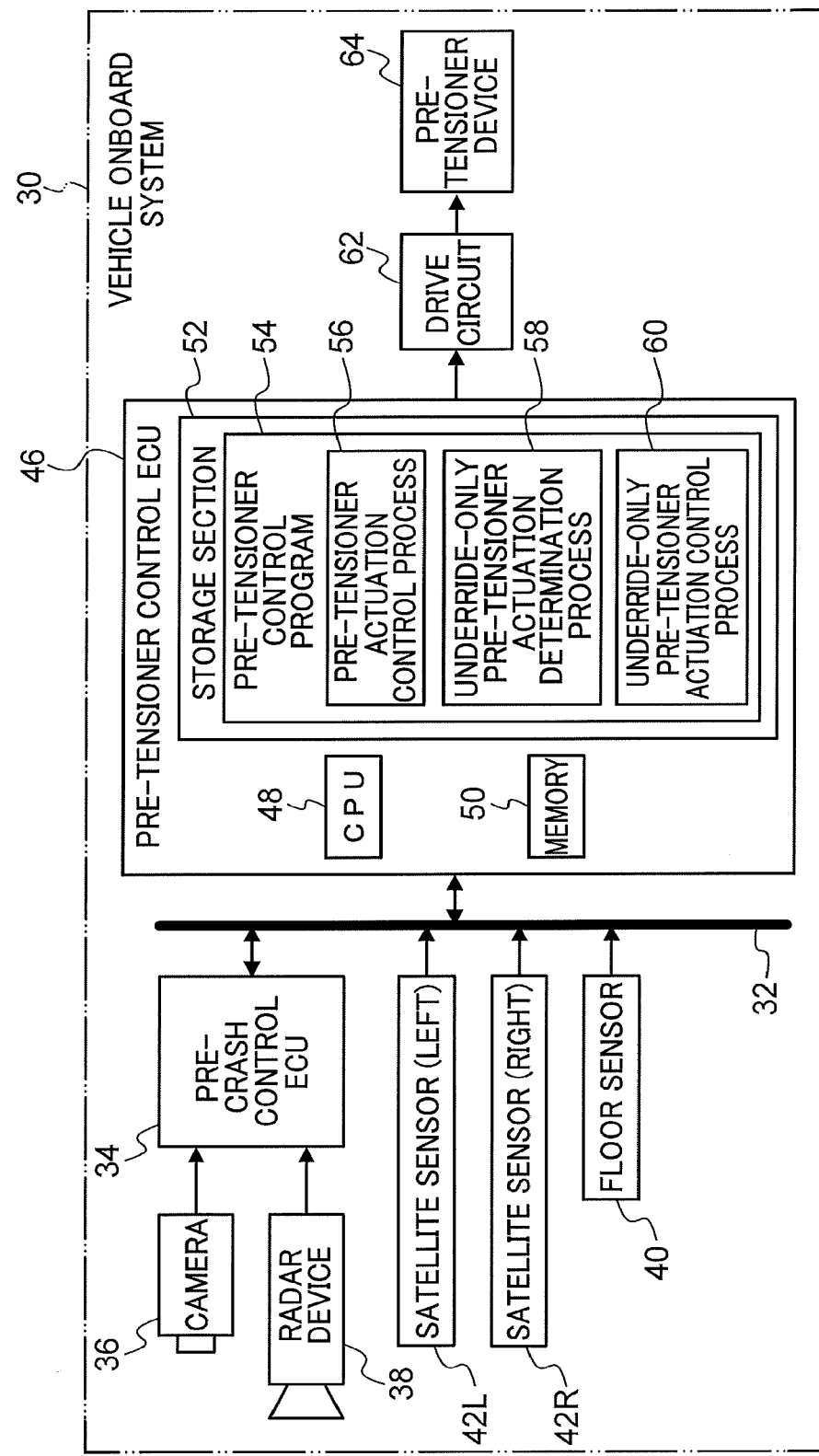

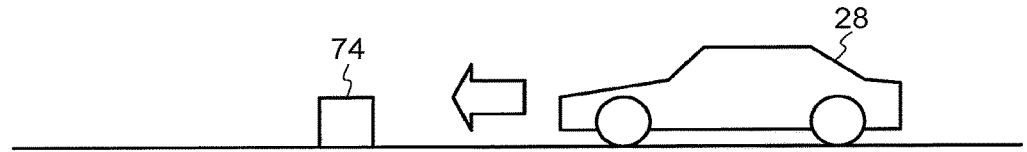
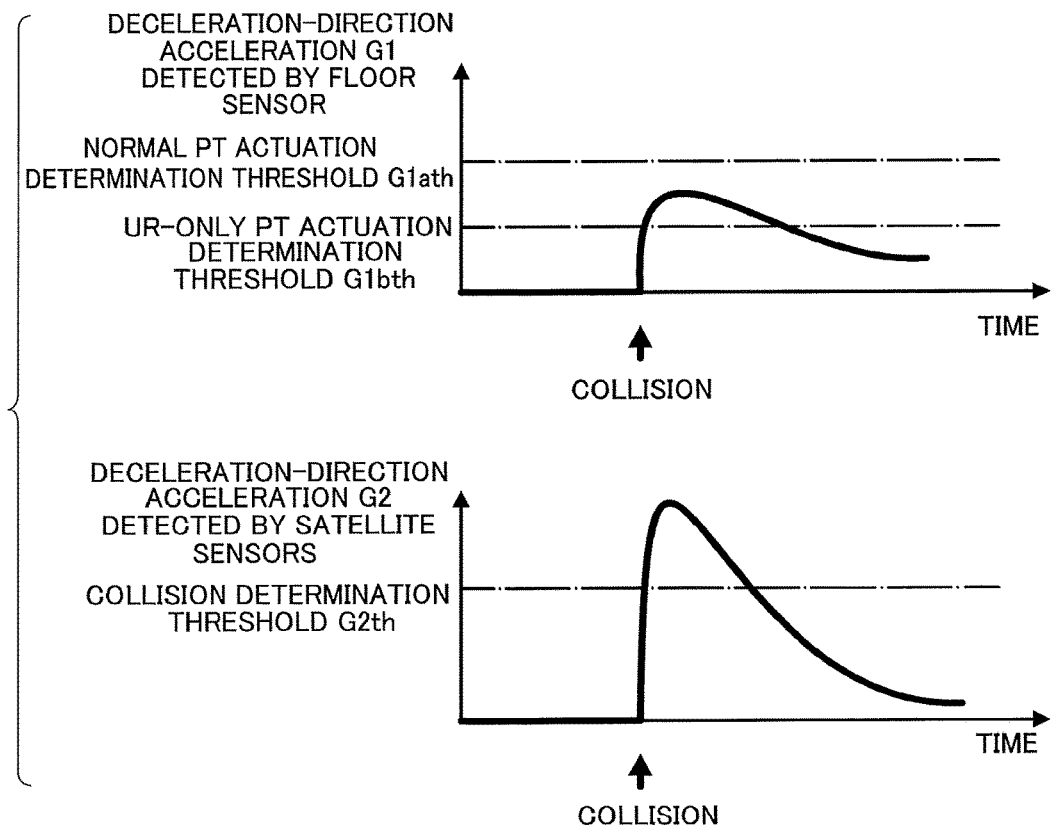

VEHICLE COLLISION DETECTION SYSTEM

CROSS-REFERENCE TO RELATED APPLICATION

This application is based on and claims priority under 35 USC 119 from Japanese Patent Application No. 2017-023998 filed on Feb. 13, 2017, the disclosure of which is incorporated by reference herein.

BACKGROUND

Technical Field

The present disclosure relates to a vehicle collision detection system.

Related Art

Japanese Patent Application Laid-Open (JP-A) No. 2001-030871 describes technology for an occupant protection device provided with left and right satellite sensors at a front section of a vehicle. The satellite sensors are configured to detect a vehicle collision by detecting backward movement of a headlight lamp body. In JP-A No. 2001-030871, a threshold used to compare detection results of a floor sensor is modified on the basis of ON signals from the left and right satellite sensors, and an airbag device is actuated based on the result of comparing detection results of the floor sensor against the modified threshold. JP-A No. 2001-030871 states that an advantageous effect of this technology is the ability to detect collisions even in cases in which a collision counterpart object is comparatively soft, or in cases in which the collision mode is an underride mode.

An underride collision mode collision arises in cases in which, for example, a comparatively small vehicle (such as a passenger car) collides with the rear of a comparatively large vehicle that has a space below a vehicle rear section (for example, a large truck with a space below the trailer bed). Moreover, an underride mode is a collision mode in which the front section of the comparatively small vehicle at the rear burrows into the space below the rear section of the comparatively large vehicle in front. Moreover, in an underride collision mode, there is a tendency for acceleration detected by satellite sensors to be similar to that detected in a general collision that is not in the underride collision mode, while the acceleration detected by the floor sensor is markedly smaller than in a general collision.

However, when a vehicle collides with a comparatively light object such as a small animal, the acceleration detected by the satellite sensors and the acceleration detected by the floor sensor sometimes exhibit a pattern of change similar to that in an underride collision. The technology described in JP-A No. 2001-030871 is thus unable to make a clear distinction between underride collision mode collisions and collisions between the vehicle and a comparatively light object. Accordingly, there is room for improvement in the technology described in JP-A No. 2001-030871 since there is a possibility that an occupant restraint device such as an airbag device might actuate at a timing when occupant restraint is not required.

SUMMARY

An aspect of the present disclosure is a vehicle collision detection system that includes: a determination section that, in a case in which a collision between an object and a vehicle installed with an occupant restraint device has been predicted by a collision prediction section, determines whether or not a collision mode between the vehicle and the object is an underride mode based on an acceleration detected by a first acceleration sensor provided in a vehicle cabin and an acceleration detected by a second acceleration sensor provided further toward a vehicle front than the vehicle cabin, and also determines whether or not the object is another vehicle; and a controller that actuates the occupant restraint device in a case in which a collision between the vehicle and an object has been predicted by the collision prediction section, the collision mode has been determined to be the underride mode by the determination section, the object has been determined to be another vehicle by the determination section, and the acceleration detected by the first acceleration sensor is at or above an underride-mode-actuation determination threshold that is lower than a normal-actuation determination threshold for the occupant restraint device.

BRIEF DESCRIPTION OF THE DRAWINGS

Exemplary embodiments of the present invention will be described in detail based on the following figures, wherein:

FIG. 3 is a block diagram illustrating hardware configuration of parts of a vehicle onboard system functioning as a vehicle collision detection system;

FIG. 7A is an illustration of a case of a collision between a passenger car and a light object, as an example in which changes in detected acceleration resemble those in the case of an underride collision mode;

FIG. 7B illustrates graphs illustrating an example of changes in detected acceleration in the collision illustrated in FIG. 7A.

DETAILED DESCRIPTION

Figure 1:
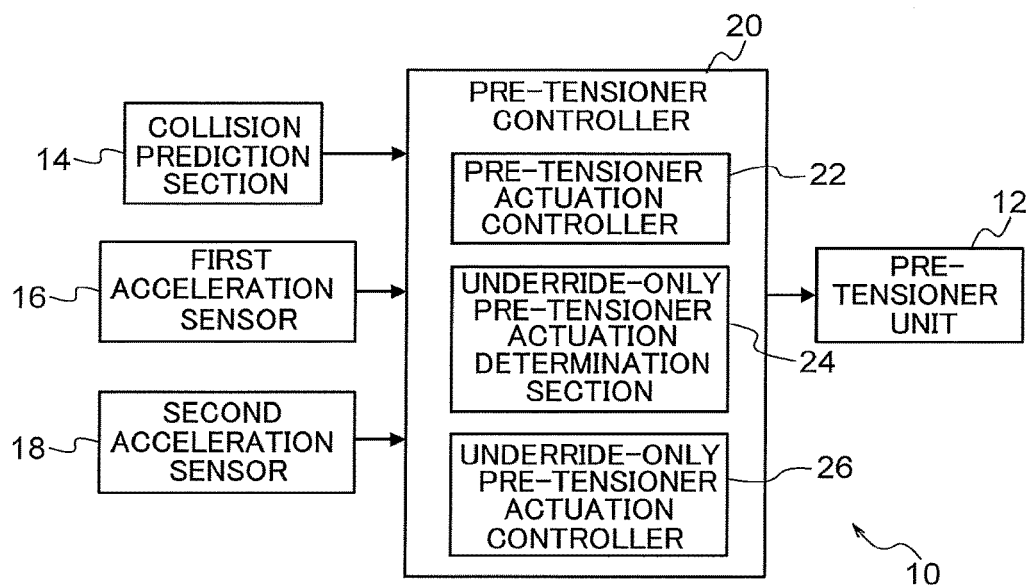
FIG. 1 is a schematic block diagram of a vehicle collision detection system according to an exemplary embodiment.

Detailed explanation follows regarding an example of an exemplary embodiment of the present disclosure, with reference to the drawings. FIG. 1 illustrates a vehicle collision detection system 10 according to the present exemplary embodiment. A configuration is illustrated in which the vehicle collision detection system 10 is applied to a pre-tensioner unit 12, serving as an example of an occupant restraint device of the present disclosure. The pre-tensioner unit 12 is installed to a vehicle 28 (see FIG. 2), and takes up slack in a seatbelt (webbing) of the vehicle 28. Note that hereafter, "pre-tensioner" is abbreviated to "PT", and "pre-tensioner unit" is abbreviated to "PTU".

The vehicle collision detection system 10 includes a PT controller 20. The PT controller 20 includes a PT actuation controller 22, an underride-only PT actuation determination section 24, and an underride-only PT actuation controller 26. Note that "underride" is sometimes abbreviated to "UR" hereafter. The UR-only PT actuation determination section 24 is an example of a determination section of the present disclosure, and the UR-only PT actuation controller 26 is an example of a controller of the present disclosure. The PTU 12 mentioned above, a collision prediction section 14, a first acceleration sensor 16, and second acceleration sensors 18 are each connected to the PT controller 20.

As will be described in detail later, the collision prediction section 14 monitors the vicinity of the vehicle 28, including at least in front of the vehicle 28 (an example of the monitoring range of the collision prediction section 14 is illustrated by range D in FIG. 2), and predicts a collision between the vehicle 28 and an object, for example another vehicle. The collision prediction section 14 also detects the type of object with which the vehicle 28 has been predicted to collide (for example, whether the object is a vehicle or something other than a vehicle). When a collision between the vehicle 28 and an object has been predicted, the collision prediction section 14 outputs a collision prediction signal, including information about the object with which the vehicle 28 has been predicted to collide.

Figure 2:
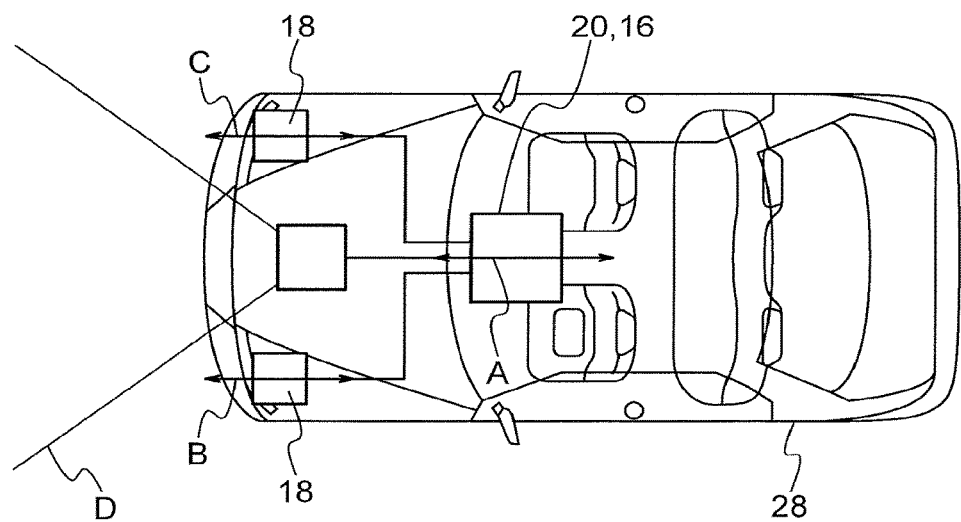
FIG. 2 is a plan view illustrating an example of a monitoring range of a collision prediction section, and acceleration detection positions of a first acceleration sensor and a second acceleration sensor.

As illustrated in FIG. 2, the first acceleration sensor 16 is installed together with the PT controller 20, inside the vehicle cabin of the vehicle 28. As illustrated by arrow A in FIG. 2, the first acceleration sensor 16 detects front-rear direction acceleration G1 of the vehicle 28 inside the vehicle cabin of the vehicle 28. Moreover, as illustrated in FIG. 2, the second acceleration sensors 18 are installed on the left and right in the vicinity of a front end section of the vehicle 28. As illustrated by arrows B and C in FIG. 2, the second acceleration sensors 18 detect front-rear direction acceleration G2 at the left and right of the vehicle 28 in the vicinity of the front end section of the vehicle 28.

The PT controller 20 controls actuation of the PTU 12 based on the collision prediction signal input from the collision prediction section 14, the vehicle cabin interior acceleration G1 detected by the first acceleration sensor 16, and the vehicle front end section acceleration G2 detected by the second acceleration sensors 18.

More precisely, when the collision prediction section 14 has predicted a collision between the vehicle 28 and an object, the UR-only PT actuation determination section 24 of the PT controller 20 determines whether or not the collision mode of the predicted collision is a UR mode, based on the vehicle cabin interior acceleration G1 and the vehicle front end section acceleration G2. Moreover, the UR-only PT actuation determination section 24 determines whether or not the object with which the vehicle 28 has been predicted to collide is a vehicle (another vehicle).

The UR-only PT actuation controller 26 determines whether or not the following four conditions have all been met within a predetermined duration: (1) a collision between the vehicle 28 and an object having been predicted; (2) the collision mode having been determined to be a UR mode; (3) the object with which a collision has been predicted having been determined to be a vehicle; and (4) the vehicle cabin interior acceleration G1 being at or above a UR-only PT actuation determination threshold G1$bth$. When these four conditions have not been met within the predetermined duration, the PT actuation controller 22 monitors whether or not the vehicle cabin interior acceleration G1 is at or above a normal PT actuation determination threshold G1$ath$, and actuates the PTU 12 if the vehicle cabin interior acceleration G1 is at or above the normal PT actuation determination threshold G1$ath$. On the other hand, the UR-only PT actuation controller 26 actuates the PTU 12 in cases in which all of the conditions (1) to (4) have been met within the predetermined duration.

The vehicle collision detection system 10 illustrated in FIG. 1 is implemented, for example, by a vehicle onboard system 30, illustrated in FIG. 3, that is installed to the vehicle 28. The vehicle onboard system 30 is provided with a bus 32 to which plural electronic control units (control units including a CPU, memory, and a non-volatile storage section, referred to below as ECUs) that perform different control to each other are connected. Note that FIG. 1 illustrates only part of the vehicle onboard system 30. A pre-crash control ECU 34, a floor sensor 40, this being an example of the first acceleration sensor 16, left and right satellite sensors 42L, 42R, these being examples of the second acceleration sensors 18, and a PT control ECU 46 are respectively connected to the bus 32. Note that "pre-crash" is abbreviated to "PC" hereafter.

A camera 36 and a radar device 38 are connected to the PC control ECU 34. The camera 36 images the vicinity of the vehicle 28, including at least in front of the vehicle 28. Captured images are output to the PC control ECU 34. Note that the camera 36 may include plural cameras that image different ranges to each other, including a camera that images toward the front of the vehicle 28. Note that the PC control ECU 34, the camera 36, and the radar device 38 are an example of the collision prediction section 14.

The radar device 38 detects point information for objects such as pedestrians and other vehicles present in the vicinity of the vehicle 28, including at least in front of the vehicle 28. The radar device 38 acquires positions of the detected objects relative to the vehicle 28, and the speed of the detected objects relative to the vehicle 28. The radar device 38 also has an in-built processor to process observation results relating to objects in the vicinity. The processor excludes noise and roadside objects such as guard rails from monitoring targets, for example based on changes in the relative positions and relative speeds of the individual objects included in plural recent observation results. The processor thereby tracks specific objects such as pedestrians, other vehicles, and the like as monitoring targets. The radar device 38 also outputs information such as the relative positions and relative speeds of the individual monitoring targets to the PC control ECU 34.

The PC control ECU 34 detects the positions of the individual monitoring targets in the images input from the camera 36, based on the information input from the radar device 38 (for example the relative positions of the individual monitoring targets). The PC control ECU 34 also extracts feature quantities of the individual monitoring targets, and determines the type of the monitoring targets (for example pedestrian, vehicle, and so on) based on the extracted feature quantities. The PC control ECU 34 also repeats the above processing to track the monitoring targets, and computes a probability of each monitoring target colliding with the vehicle 28. When the PC control ECU 34 detects that the probability of a monitoring target colliding with the vehicle 28 is a predetermined value or greater (predicts a collision between the vehicle 28 and the monitoring target), the PC control ECU 34 transmits a collision prediction signal to a specific ECU in the vehicle onboard system 30 including the PT control ECU 46. Note that this collision prediction signal includes information regarding a collision counterpart with which a collision with the vehicle 28 has been predicted (information including, for example, the type, distance, and position of the collision counterpart). The specific ECU may, for example, include an ECU that controls actuation of an airbag device installed in the vehicle 28.

The PT control ECU 46 is connected to a PT device 64 through a drive circuit 62. When instructed by the PT control ECU 46 to actuate the PT, the drive circuit 62 causes a current that ignites a squib inside the PT device 64. When the squib is ignited, the PT device 64 takes up slack in the seatbelt of the vehicle 28 using drive force generated by ignition of the squib. The drive circuit 62 and the PT device 64 are an example of the PTU 12.

The PT control ECU 46 includes a CPU 48, memory 50, and a non-volatile storage section 52 stored with a PT control program 54. The CPU 48 reads the PT control program 54 from the storage section 52 and expands the PT control program into the memory 50, and executes processes of the PT control program 54 in sequence.

The PT control program 54 includes a PT actuation control process 56, a UR-only PT actuation determination process 58, and a UR-only PT actuation control process 60. The CPU 48 operates as the PT actuation controller 22 illustrated in FIG. 1 by executing the PT actuation control process 56. The CPU 48 operates as the UR-only PT actuation determination section 24 illustrated in FIG. 1 by executing the UR-only PT actuation determination process 58. The CPU 48 operates as the UR-only PT actuation controller 26 illustrated in FIG. 1 by executing the UR-only PT actuation control process 60. The PT control ECU 46 executing the PT control program 54 thus functions as the PT controller 20.

Figure 4A:
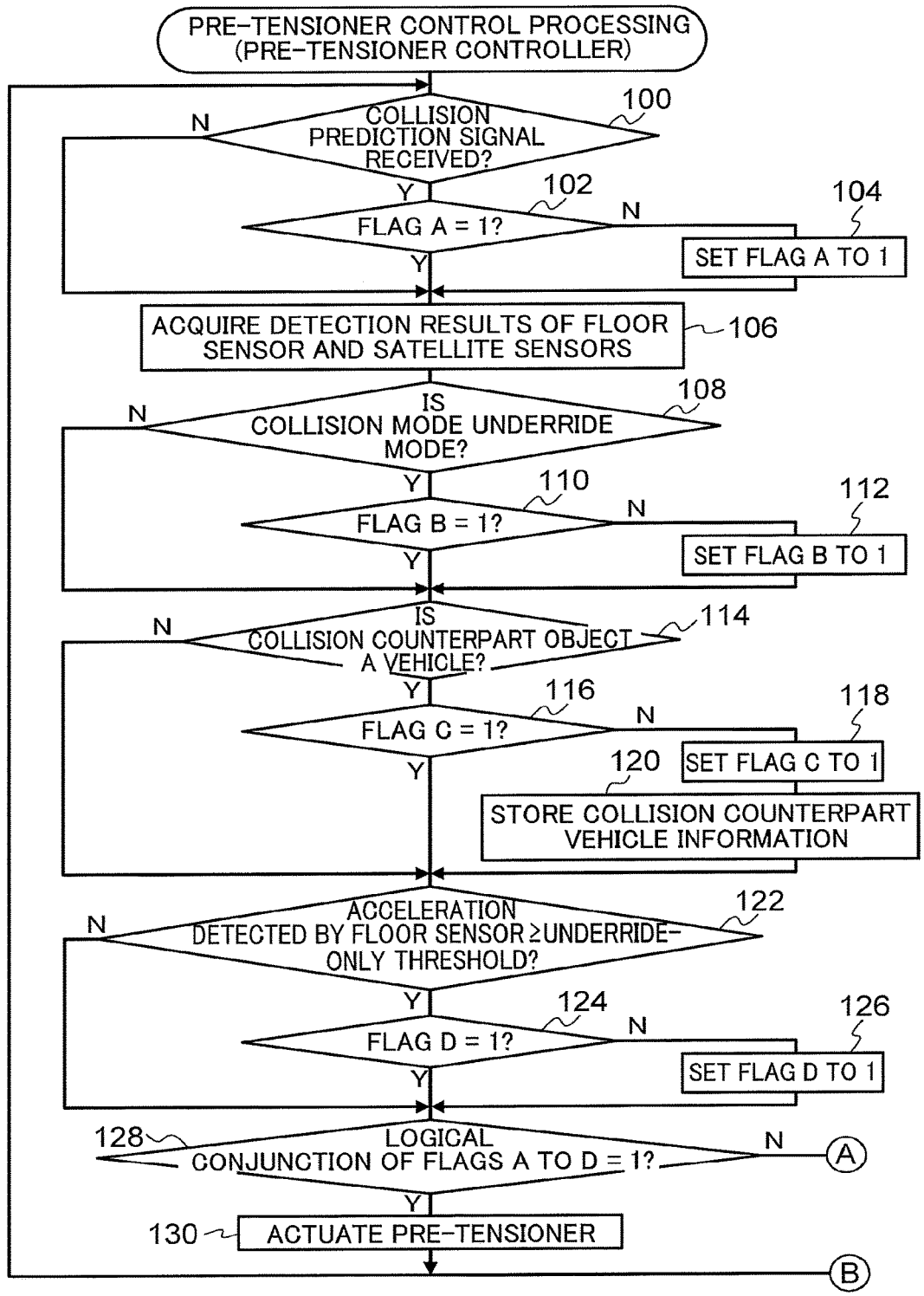
FIG. 4A and FIG. 4B are flowcharts illustrating pre-tensioner control processing executed by a pre-tensioner controller.
Figure 4B:
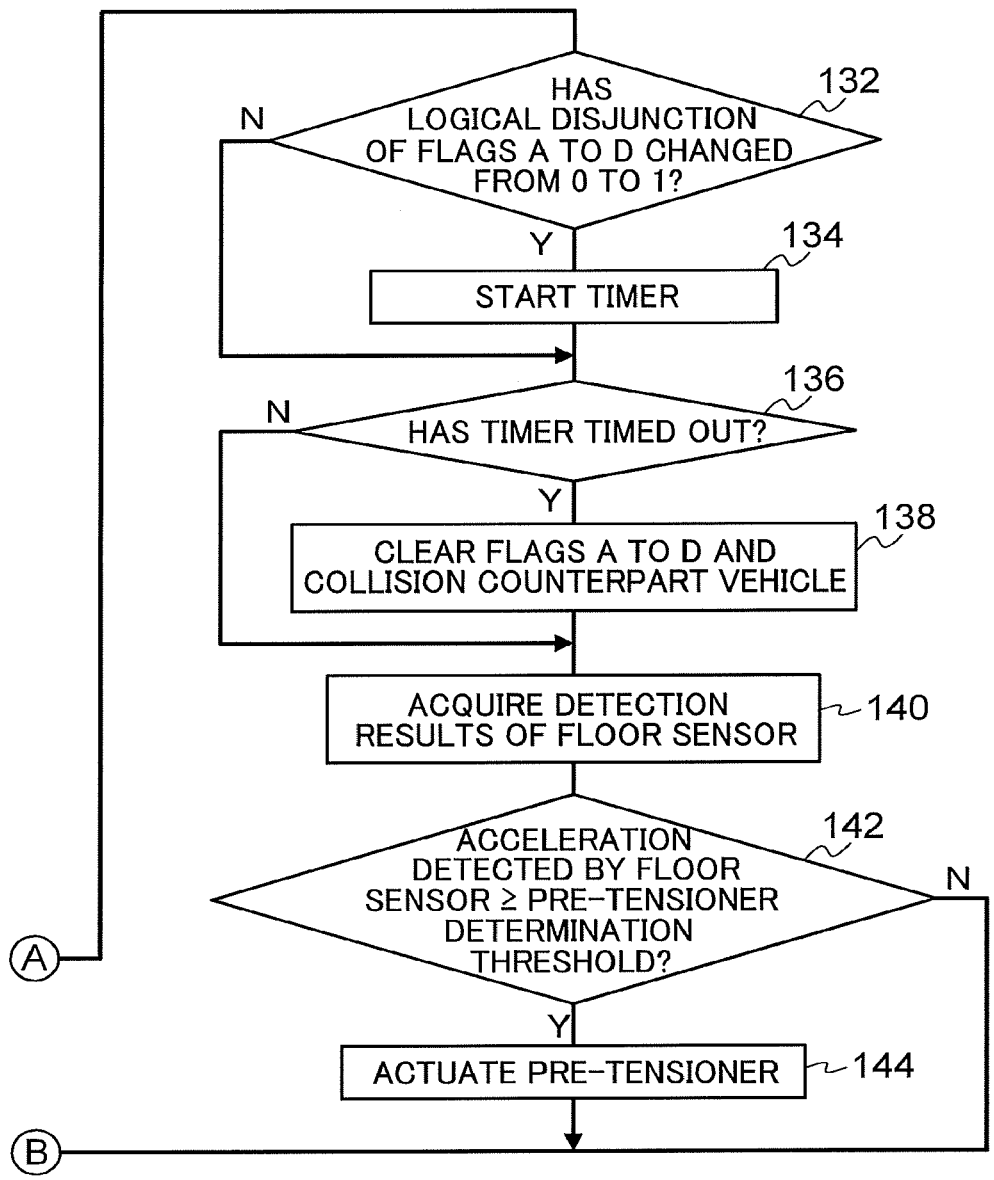

Next, explanation follows regarding PT control processing executed by the PT controller 20 when the ignition switch of the vehicle 28 is ON, with reference to FIG. 4A and FIG. 4B. Note that the PT control processing is implemented by the CPU 48 of the PT control ECU 46 executing the PT control program 54. The PT control program 54 may, for example, be stored on a non-transient recording medium such as a DVD, and loaded into the storage section 52 from the DVD.

When the ignition switch of the vehicle 28 is turned ON, the PT controller 20 initially sets each of a flag A to a flag D employed in the PT control processing to 0, and then starts execution of the PT control processing. At step 100 of the PT control processing, the UR-only PT actuation determination section 24 of the PT controller 20 determines whether or not a collision prediction signal has been received from the collision prediction section 14. When determination is negative at step 100, the collision prediction section 14 has not predicted a collision between the vehicle 28 and an object, and so processing transitions to step 106.

However, when a collision prediction signal has been received from the collision prediction section 14, determination is affirmative at step 100, and processing transitions to step 102. At step 102, the UR-only PT actuation determination section 24 determines whether or not the flag A has been set to 1. Note that when the value of the flag A is 0, this indicates that a collision between the vehicle 28 and an object has not been predicted. When the value of the flag A is 1, this indicates that a collision between the vehicle 28 and an object has been predicted.

Processing transitions to step 104 when determination is negative at step 102. At step 104, the UR-only PT actuation determination section 24 sets the flag A to 1, and processing transitions to step 106. When determination is affirmative at step 102, processing transitions to step 106 without changing the value of the flag A, such that the state in which the flag A is set to 1 is maintained for a predetermined duration.

At step 106, the UR-only PT actuation determination section 24 acquires the vehicle cabin interior acceleration G1 detected by the floor sensor 40 from the floor sensor 40, and stores this in the memory 50 or the like. The UR-only PT actuation determination section 24 also acquires the vehicle front end section acceleration G2 detected by the satellite sensors 42L, 42R from the satellite sensors 42L, 42R, and stores this in the memory 50 or the like. Step 106 is repeated while the PT control processing is being executed, thereby collecting chronological data representing change in the vehicle cabin interior acceleration G1 over time and chronological data representing change in the vehicle front end section acceleration G2 over time in the memory 50 or the like, as illustrated in FIG. 5B, FIG. 6B, and FIG. 7B, for example.

At step 108, the UR-only PT actuation determination section 24 determines whether or not the mode of the collision predicted by the collision prediction section 14 is an underride mode, based on the change in the vehicle cabin interior acceleration G1 and the vehicle front end section acceleration G2 over time represented by the data stored in the memory 50 or the like.

Figure 5A:
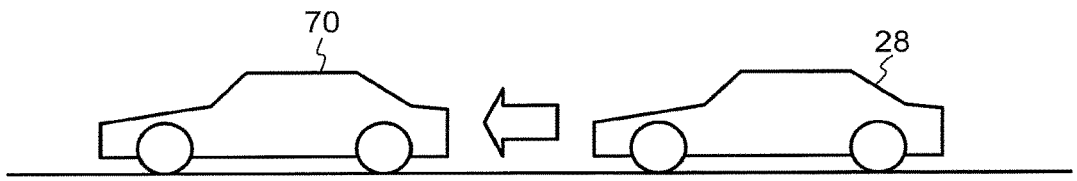
FIG. 5A is an illustration of a collision between passenger cars, as an example of a case in which a collision mode is not an underride collision mode.
Figure 5B:
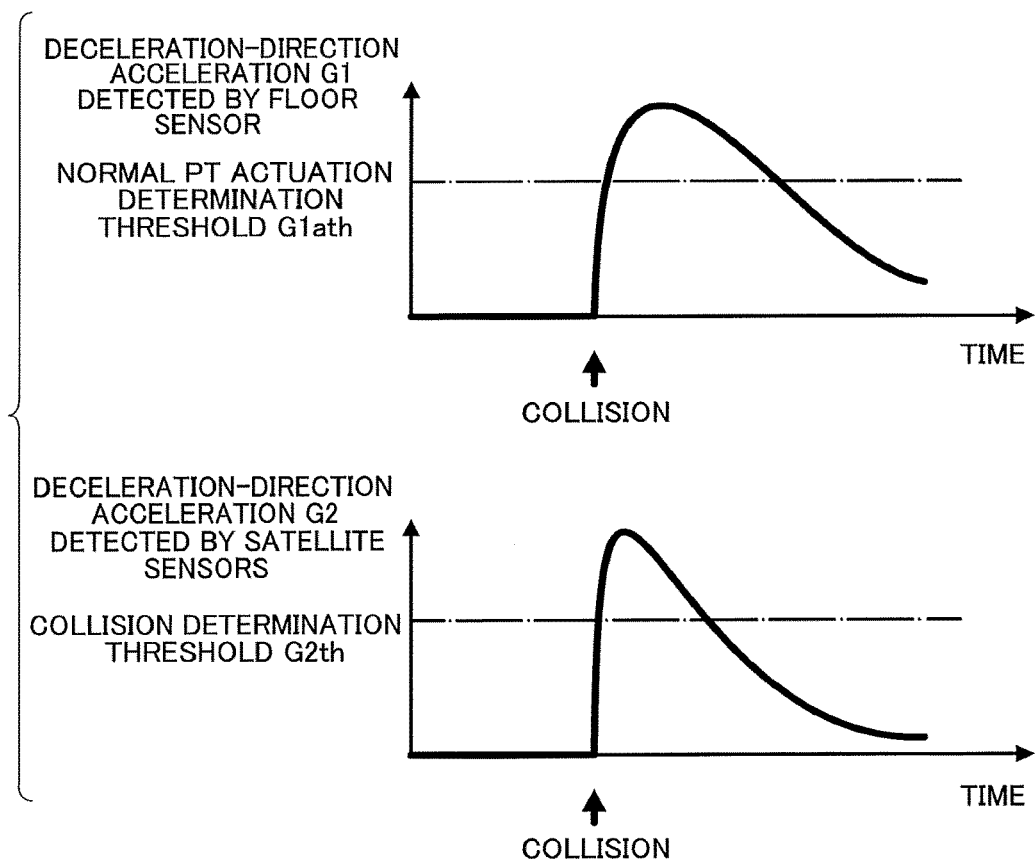
FIG. 5B illustrates graphs illustrating an example of changes in detected acceleration in the collision illustrated in FIG. 5A.

As an example, as illustrated in FIG. 5A, in a case in which the vehicle 28 collides with a passenger car 70 ahead of the vehicle 28, the collision mode will not be the underride mode since there is no space for the vehicle 28 to burrow under a lower side of a rear section of the passenger car 70. FIG. 5B illustrates an example of change over time in the vehicle cabin interior acceleration G1 and the vehicle front end section acceleration G2 in such a case. As illustrated in FIG. 5B, when the vehicle 28 collides with a passenger car 70, there is a large change in both the vehicle cabin interior acceleration G1 and the vehicle front end section acceleration G2.

Figure 6A:
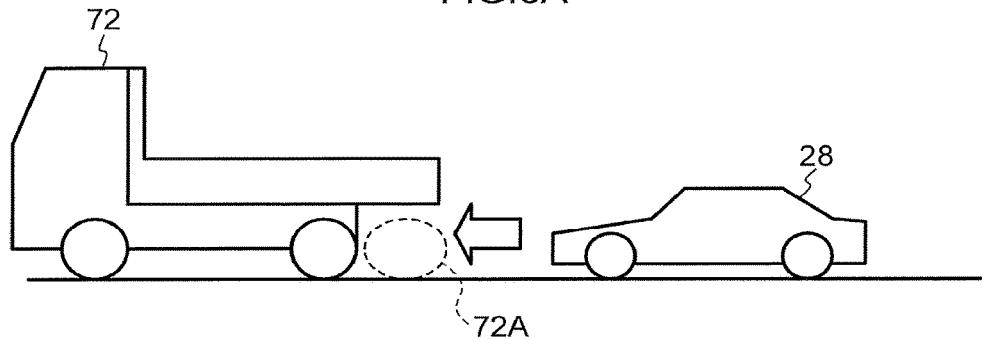
FIG. 6A is an illustration of a collision of a passenger car with a large vehicle, as an example of a case in which a collision mode is an underride collision mode.
Figure 6B:
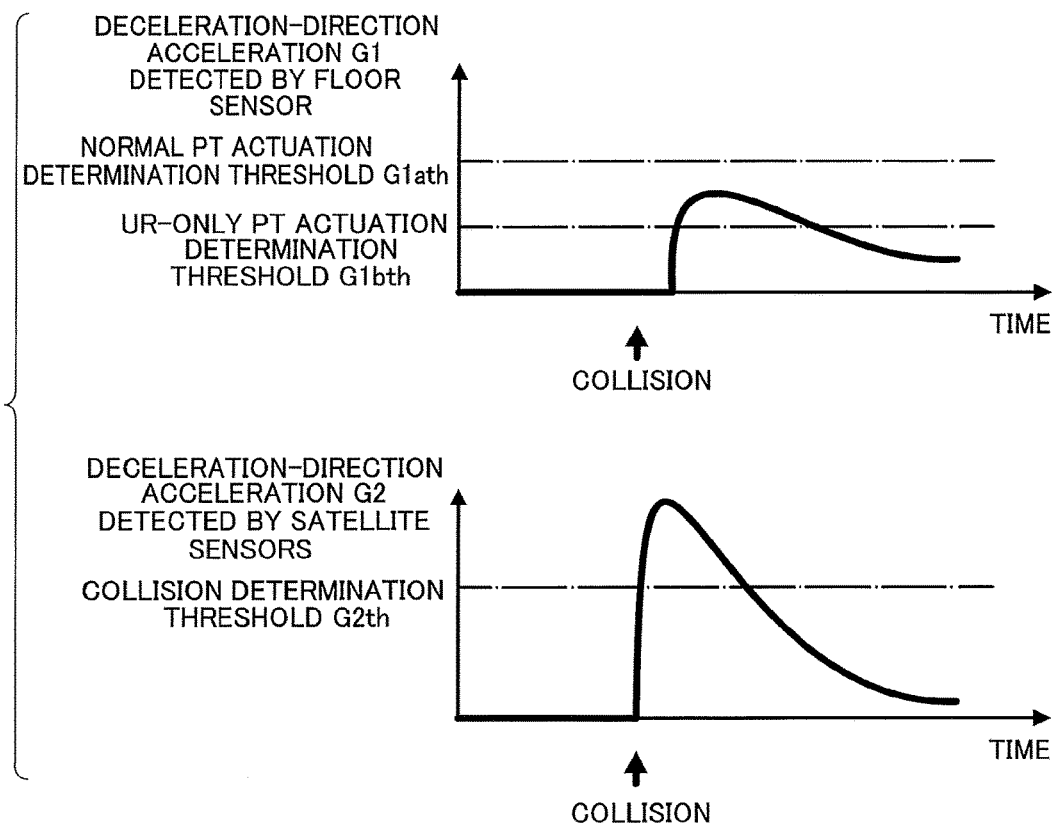
FIG. 6B illustrates graphs illustrating an example of changes in detected acceleration in the collision illustrated in FIG. 6A.

On the other hand, as illustrated in FIG. 6A, for example, in a case in which the vehicle 28 collides with a large vehicle 72 ahead of the vehicle 28, a rear section of the large vehicle 72 has a lower-side space 72A that the front section of the vehicle 28 burrows into, resulting in an underride collision mode. FIG. 6B illustrates an example of change in the vehicle cabin interior acceleration G1 and the vehicle front end section acceleration G2 over time in such a case. As illustrated in FIG. 6B, in the case of an underride collision mode, such as that in which the vehicle 28 collides with the large vehicle 72, there is a large change in the vehicle front end section acceleration G2. However, some of the collision energy propagating from the front end section toward the vehicle cabin interior is expended, for example in deformation of the front section of the vehicle 28 burrowing into the lower side space 72A, and is thus dissipated. The change in the vehicle cabin interior acceleration G1 is thus smaller than in cases in which the collision mode is not the underride mode.

The phenomenon described above can be utilized in the collision mode determination at step 108. For example, in cases in which the vehicle cabin interior acceleration G1 and the vehicle front end section acceleration G2 each change by a threshold or greater, as illustrated in FIG. 5B, the UR-only PT actuation determination section 24 determines that the collision mode is not the underride mode. In cases in which the vehicle front end section acceleration G2 changes by a threshold or greater, but the vehicle cabin interior acceleration G1 changes by less than a threshold, as illustrated in FIG. 6B, the UR-only PT actuation determination section 24 determines the collision mode to be the underride mode.

Note that the determination of the collision mode is not limited to determination performed by comparing the accelerations G1, G2 against thresholds directly. Another determination method may be employed, for example by comparing time integrals of the accelerations G1, G2 against thresholds.

At step 108, in cases in which a collision has not been predicted by the collision prediction section 14, or in cases in which a collision has been predicted by the collision prediction section 14 but the collision mode has been determined not to be the underride mode, determination is negative at step 108 and processing transitions to step 114.

On the other hand, in cases in which a collision has been predicted by the collision prediction section 14, and the collision mode has been determined to be the underride mode, determination is affirmative at step 108 and processing transitions to step 110. At step 110, the UR-only PT actuation determination section 24 determines whether or not the flag B has been set to 1. When the value of the flag B is 1, this indicates that the collision mode has been determined to be the underride mode, and when the value of the flag B is 0, this indicates that a collision has not been predicted, or that the collision mode has been determined not to be the underride mode.

When determination is negative at step 110, processing transitions to step 112. At step 112, the UR-only PT actuation determination section 24 sets the flag B to 1, and then processing transitions to step 114. When determination is affirmative at step 110, processing transitions to step 122 without changing the value of the flag B, such that the state in which the flag B is set to 1 is maintained for a predetermined duration.

At step 114, when the UR-only PT actuation determination section 24 has received a collision prediction signal from the collision prediction section 14, determination is made as to whether or not the collision counterpart object is a vehicle, based on the information regarding the collision counterpart included in the received collision prediction signal. When a collision prediction signal has not been received from the collision prediction section 14, or when a collision prediction signal has been received from the collision prediction section 14 but the collision counterpart object is not a vehicle, determination is negative at step 114, and processing transitions to step 122.

On the other hand, when a collision prediction signal has been received from the collision prediction section 14, and the information regarding the collision counterpart object included in the received collision prediction signal is information indicating that the collision counterpart object is a vehicle, determination is affirmative at step 114, and processing transitions to step 116. At step 116, the UR-only PT actuation determination section 24 determines whether or not the flag C has been set to 1. When the value of the flag C is 1, this indicates that the collision counterpart object is a vehicle, and when the value of the flag C is 0, this indicates that the collision counterpart object is not a vehicle, or that no collision counterpart object is present.

Processing transitions to step 118 when determination is negative at step 116. At step 118, the UR-only PT actuation determination section 24 sets the flag C to 1. At the next step 120, the UR-only PT actuation determination section 24 stores the information regarding the collision counterpart object included in the received collision prediction signal in the memory 50 or the like as collision counterpart vehicle information, and processing transitions to step 122. When determination is affirmative at step 116, processing transitions to step 122 without changing the value of the flag C, such that the state in which the flag C is set to 1 is maintained for a predetermined duration.

At step 122, the UR-only PT actuation determination section 24 determines whether or not the vehicle cabin interior acceleration G1 acquired from the floor sensor 40 at step 106 is at or above the UR-only PT actuation determination threshold $G1bth$. As is clear from comparison of FIG. 6A and FIG. 5A, when the collision mode is the underride mode, the change in the vehicle cabin interior acceleration G1 is smaller than when the collision mode is not the underride mode. Accordingly, when the collision mode is the underride mode, PT actuation determination employs the UR-only PT actuation determination threshold $G1bth$ (see FIG. 6B), this being a smaller value than the normal PT actuation determination threshold $G1ath$ (see FIG. 5B) employed when the collision mode is not the underride mode.

When the vehicle cabin interior acceleration G1 is lower than the UR-only PT actuation determination threshold $G1bth$, determination is negative at step 122 and processing transitions to step 128. When the vehicle cabin interior acceleration G1 is at or above the UR-only PT actuation determination threshold $G1bth$, determination is affirmative at step 122, and processing transitions to step 124. At step 124, the UR-only PT actuation determination section 24 determines whether or not the flag D has been set to 1. Note that when the value of the flag D is 0, this indicates that the vehicle cabin interior acceleration G1 is lower than the UR-only PT actuation determination threshold $G1bth$, and when the value of the flag D is 1, this indicates that the vehicle cabin interior acceleration G1 is at or above the UR-only PT actuation determination threshold $G1bth$.

Processing transitions to step 126 when determination is negative at step 124. At step 126, the UR-only PT actuation determination section 24 sets the flag D to 1, and processing transitions to step 128. When determination is affirmative at step 124, processing transitions to step 128 without changing the value of the flag D, such that the state in which the flag D is set to 1 is maintained for a predetermined duration.

At step 128, the UR-only PT actuation controller 26 computes a logical conjunction (AND) of the flag A to the flag D, and determines whether or not the result of computing the logical conjunction of the flag A to the flag D is 1. Step 128 corresponds to actuation determination for the UR-only PT. When determination is affirmative at step 128, the PT is actuated as described below. Explanation follows regarding the reason why determination is made as to whether or not the logical conjunction of the flag A to the flag D is 1 in the UR-only PT actuation determination.

When the logical conjunction of the flag A to the flag D is 1, determination is affirmative at each of the steps 100, 108, 114, and 122. More precisely, the timings of each of the affirmative determinations fell within a predetermined duration, as described below. Namely, the following four conditions will all have been met within the predetermined duration: (1) a collision between the vehicle 28 and an object having been predicted; (2) the collision mode having been determined to be the UR mode; (3) the object with which a collision has been predicted having been determined to be a vehicle; and (4) the vehicle cabin interior acceleration G1 being at or above the UR-only PT actuation determination threshold $G1bth$.

The reason for including condition (3) is as follows. Namely, FIG. 7A illustrates an example of a case in which the vehicle 28 collides with a light object 74 ahead of the vehicle 28. The light object 74 is, for example, a small animal or a fallen object on the road. Such a collision mode does not correspond to the underride mode. However, as illustrated in FIG. 7B, in such cases, the changes in the vehicle cabin interior acceleration G1 and the vehicle front end section acceleration G2 over time are similar to those when the collision mode is the underride mode, in that there is a large change to the vehicle front end section acceleration G2 but a small change in the vehicle cabin interior acceleration G1. This is since although an impact is applied to the vehicle front end section by the collision with the object 74, since the object 74 is light, the actual collision energy is small, and the energy dissipates as it propagates from the vehicle front end section toward the vehicle cabin interior such that the energy applied at the vehicle cabin interior is small.

As is clear from comparison of FIG. 7B and FIG. 6B, when the vehicle 28 collides with the light object 74, the changes to the vehicle cabin interior acceleration G1 and the vehicle front end section acceleration G2 over time resemble those when the collision mode is the underride mode. Accordingly, it is possible that when the vehicle 28 collides with the light object 74, the condition (2) determination based on the changes to the accelerations G1, G2 over time might result in the collision mode being incorrectly determined to be the UR mode. Accordingly, in the present exemplary embodiment, condition (3) is included in order to suppress unwanted PT actuation as a result of incorrect determination for condition (2) in cases in which the vehicle 28 collides with the light object 74. The PT is thus actuated when all of the conditions (1) to (4) have been met, namely when the logical conjunction of the flag A to the flag D is 1.

When the vehicle 28 collides with the light object 74, there is almost no chance of the light object 74 being incorrectly determined to be a vehicle, even if condition (2) has been met as a result of incorrect determination. Therefore, condition (3) is not met. This thereby enables unwanted PT actuation to be suppressed in cases in which the vehicle 28 collides with the light object 74. Note that as illustrated in FIG. 5A, condition (3) is also met when the vehicle 28 collides with the passenger car 70. However, unwanted PT actuation can be suppressed since condition (2) is not met in such cases.

Processing transitions to step 132 in cases in which determination is negative at step 128. At step 132, the UR-only PT actuation controller 26 computes the logical disjunction (OR) of the flag A to the flag D, and determines whether or not the immediately preceding result of computing the logical disjunction of the flag A to the flag D was 0, and whether or not the result of computing the logical disjunction of flag A to the flag D on the current occasion has resulted in a change to 1. The value of the logical disjunction of the flag A to the flag D is 0 in a state in which none of the conditions (1) to (4) has been met, and the value changes to 1 on switching to a state in which at least one of the conditions (1) to (4) has been met.

Processing transitions to step 134 in cases in which determination is affirmative at step 132. At step 134, the UR-only PT actuation controller 26 starts a timer that times out when a predetermined duration has elapsed. Processing then transitions to step 136. The timer started at step 134 therefore times out when the predetermined duration has elapsed since the timing when the state in which none of the conditions (1) to (4) were met switched to a state in which at least one out of the conditions (1) to (4) was met. Moreover, when determination is negative at step 132, step 134 is skipped and processing transitions to step 136.

At step 136, the UR-only PT actuation determination section 24 determines whether or not the timer started at the preceding step 134 has timed out. In cases in which the timer has not been started, and in cases in which the timer has been started but has not timed out, determination is negative at step 136 and processing transitions to step 140.

In cases in which the timer has timed out, determination is affirmative at step 136 and processing transitions to step 138. At step 138, the UR-only PT actuation determination section 24 sets each of the flag A to the flag D to 0. Then, after clearing the collision counterpart vehicle information stored in the memory 50 or the like at step 120 from the memory 50 or the like, processing transitions to step 140.

Accordingly, determination is affirmative at step 136 in cases in which not all of the conditions (1) to (4) are met before the predetermined duration elapses after a state in which none of the conditions (1) to (4) are met switches to a state in which at least one out of the conditions (1) to (4) has been met. In such cases, since the logical conjunction of the flag A to the flag D is not 1, the PT is not actuated, and the flag A to the flag D are returned to 0 and the information regarding the collision counterpart object is erased from the memory 50 or the like.

At the next step 140, the PT actuation controller 22 acquires the vehicle cabin interior acceleration G1 detected by the floor sensor 40 from the floor sensor 40. At step 142, the PT actuation controller 22 determines whether or not the vehicle cabin interior acceleration G1 acquired from the floor sensor 40 at step 140 is at or above the normal PT actuation determination threshold $G1ath$ (see FIG. 5B). Processing returns to step 100 in cases in which determination is negative at step 142.

When determination is affirmative at step 142, since it may be determined that a collision with a collision mode other than the underride mode has occurred (for example a collision such as that illustrated in FIG. 5A), processing transitions to step 144. At step 144, the PT actuation controller 22 actuates the PTU 12 by outputting a PT actuation instruction to the drive circuit 62. Thus, slack in the seatbelt of the vehicle 28 is taken up by the PT device 64 when the squib is ignited, thereby enabling restraint of an occupant of the vehicle 28 by restraining the occupant with the seatbelt.

While PT control processing is being executed, steps 140, 142 are repeated if determination is negative at step 128 since the logical conjunction of the flag A to the flag D is not 1. Accordingly, when an underride mode collision has not occurred, the PT is actuated when the vehicle cabin interior acceleration G1 is at or above the normal PT actuation determination threshold $G1ath$ as a result of a collision such as that illustrated in FIG. 5A.

Moreover, in a case in which all of the conditions (1) to (4) are met before the predetermined duration has elapsed after a state in which none of the conditions (1) to (4) have been met switches to a state in which at least one out of the conditions has been met, determination becomes affirmative at step 128 before step 138 is executed. The conditions (1) to (4) include condition (3), namely the object with which a collision has been predicted having been determined to be a vehicle. Therefore, the determination does not become affirmative at step 128 in cases in which the vehicle 28 collides with the light object 74. Accordingly, it may be determined that an underride mode collision has occurred when determination is affirmative at step 128.

Accordingly, processing transitions to step 130 when determination is affirmative at step 128. At step 130, the UR-only PT actuation controller 26 outputs a PT actuation instruction to the drive circuit 62 to actuate the PTU 12. Thus, slack in the seatbelt of the vehicle 28 is taken up by the PT device 64 when the squib is ignited, and the occupant of the vehicle 28 is restrained by the seatbelt. This thereby enables the occupant to be protected in cases in which the collision mode is the underride mode.

Figure 8:
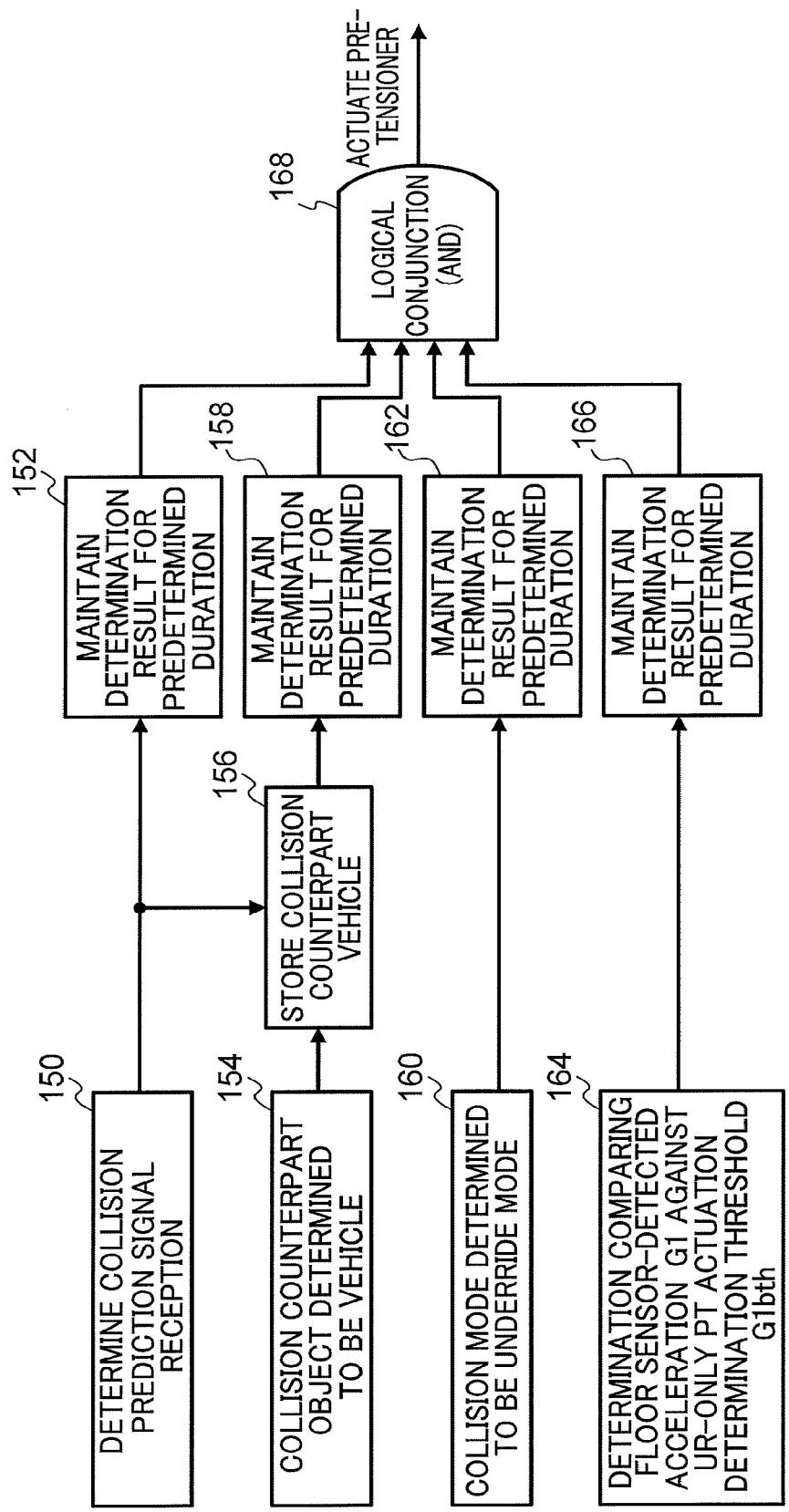
FIG. 8 is a schematic diagram illustrating determination logic in pre-tensioner control processing.

Note that FIG. 8 is a schematic representation of the logic used to determine that "an underride mode collision has occurred" in the PT control processing illustrated in FIG. 4A and FIG. 4B. "Determine collision prediction signal reception" at step 150 of FIG. 8 corresponds to step 100 in FIG. 4A. "Maintain determination result for predetermined duration" at step 152 of FIG. 8 corresponds to steps 102, 104, and 132 to 138 in FIG. 4B. "Collision counterpart object determined to be vehicle" at step 154 of FIG. 8 corresponds to step 114 in FIG. 4A. "Store collision counterpart vehicle" at step 156 of FIG. 8 corresponds to step 120 in FIG. 4A. "Maintain determination result for predetermined duration" at step 158 of FIG. 8 corresponds to steps 106, 108, and 132 to 138 in FIG. 4A and FIG. 4B. "Collision mode determined to be underride mode" at step 160 of FIG. 8 corresponds to step 108 in FIG. 4A. "Maintain determination result for predetermined duration" at step 162 of FIG. 8 corresponds to steps 110, 112, and 132 to 138 in FIG. 4A and FIG. 4B. "Determination comparing floor sensor-detected acceleration G1 against UR-only PT actuation determination threshold G1$bth$" at step 164 of FIG. 8 corresponds to step 122 in FIG. 4A. "Maintain determination result for predetermined duration" at step 166 of FIG. 8 corresponds to steps 124, 126, and 132 to 138 in FIG. 4A and FIG. 4B. "Logical conjunction (AND)" at step 168 of FIG. 8 corresponds to step 128 in FIG. 4A.

As described above, in the present exemplary embodiment, when a collision between the vehicle 28 installed with the PTU 12 and an object has been predicted by the collision prediction section 14, the UR-only PT actuation determination section 24 makes the following determination. Namely, the UR-only PT actuation determination section 24 determines whether or not the collision mode between the vehicle 28 and the object is the underride mode and determines whether or not the object is a vehicle, based on the accelerations G1, G2 detected by the floor sensor 40 and the satellite sensors 42L, 42R. The UR-only PT actuation controller 26 actuates the PTU 12 in cases in which the following conditions have been met. The conditions are: a collision between the vehicle 28 and an object having been predicted; the collision mode having been determined to be a underride mode; the object having been determined to be a vehicle; and the acceleration G1 detected by the floor sensor 40 being at or above the UR-only PT actuation determination threshold G1$bth$ that is lower than the normal PT actuation determination threshold G1$ath$. This thereby enables unwanted actuation of the PTU 12 to be suppressed in cases in which the collision mode is not the underride mode.

Moreover, in the present exemplary embodiment, the UR-only PT actuation controller 26 actuates the PTU 12 in cases in which the conditions of (1) a collision having been predicted, (2) the collision mode being the underride mode, (3) the collision counterpart object being a vehicle, and (4) the acceleration G1 being at or above the UR-only PT actuation determination threshold G1$bth$ have each been met within the predetermined duration. There is a high likelihood of the collision mode being the underride mode in cases in which the timings at which the respective conditions (1) to (4) are met fall within the predetermined duration, even if there is some variation in the timings at which the respective conditions are met such that the times at which the respective conditions are met are not concurrent. The present exemplary embodiment enables reliable actuation of the PTU 12 in such cases in which there is a high likelihood of the collision mode being the underride mode.

Moreover, in the present exemplary embodiment, the object is detected repeatedly while a collision between the vehicle 28 and the object is being predicted by the collision prediction section 14. The UR-only PT actuation determination section 24 also retains information regarding the object detected by the collision prediction section 14 for a predetermined duration as collision counterpart vehicle information when a collision has been predicted by the collision prediction section 14 and the object has been determined to be a vehicle. This thereby enables a situation in which the PTU 12 cannot be actuated to be forestalled in cases in which an object with which the vehicle has initially been predicted to collide becomes undetectable while the collision between the vehicle 28 and the object is still predicted.

Note that no particular explanation has been given regarding cases in which the vehicle front end section acceleration G2 detected by the satellite sensors 42L, 42R, these being an example of the second acceleration sensors 18, differs between the left and right. However, for example, whichever out of the left and right acceleration G2 has the higher value may be employed as a representative value. Moreover, an average value of the left and right accelerations G2 may be employed as a representative value. Moreover, there is no limitation to providing the second acceleration sensors 18 of the present disclosure on the left and right of the vehicle as in the case of the satellite sensors 42L, 42R, and a single sensor, or three or more sensors may be provided, as long as the acceleration acting on the front section of the vehicle 28 can be detected.

Moreover, in the foregoing explanation, the PT is actuated when the logical conjunction of the flag A to the flag D becomes 1 within the predetermined duration, starting from the timing at which the logical disjunction of the flag A to the flag D changes from 0 to 1, namely the timing at which one or more of the conditions (1) to (4) is met following a state in which none of the conditions (1) to (4) are met. However, there is no limitation thereto. For example, if the duration measured by the timer in the above configuration is taken as a duration t1 , the duration measured by the timer may be changed to t2 (t2<t1), with the timer being restarted each time the number of flags with a value of 1 increases. If the number of flags with a value of 1 further increases within the duration t2, starting from a timing at which the number of flags with a value of 1 increased, the timer is started again using this timing as a new start point. The present disclosure encompasses such a configuration.

Explanation has been given regarding the PTU 12 as an example of an occupant restraint device of the present disclosure. However, there is no limitation thereto, and the occupant restraint device may be configured by an occupant protection device, such as an airbag device.

An object of the present disclosure is to suppress unwanted actuation of an occupant restraint device in a non-underride collision mode collision.

A first aspect of the present disclosure is a vehicle collision detection system that includes: a determination section that, in a case in which a collision between an object and a vehicle installed with an occupant restraint device has been predicted by a collision prediction section, determines whether or not a collision mode between the vehicle and the object is an underride mode based on an acceleration detected by a first acceleration sensor provided in a vehicle cabin and an acceleration detected by a second acceleration sensor provided further toward a vehicle front than the vehicle cabin, and also determines whether or not the object is another vehicle; and a controller that actuates the occupant restraint device in a case in which a collision between the vehicle and an object has been predicted by the collision prediction section, the collision mode has been determined to be the underride mode by the determination section, the object has been determined to be another vehicle by the determination section, and the acceleration detected by the first acceleration sensor is at or above an underride-mode-actuation determination threshold that is lower than a normal-actuation determination threshold for the occupant restraint device.

In the first aspect, when a collision between an object and the vehicle installed with the occupant restraint device has been predicted by the collision prediction section, the determination section performs the following determination. Namely, the determination section determines whether or not the collision mode between the vehicle and the object is an underride mode based on the acceleration detected by the first acceleration sensor provided in the vehicle cabin and the acceleration detected by the second acceleration sensor provided further toward the vehicle front than the vehicle cabin, and also determines whether or not the object is a vehicle.

The controller actuates the occupant restraint device in cases in which the following conditions have been met. The conditions are: a collision between the vehicle and an object having been predicted; the collision mode having been determined to be the underride mode; the object having been determined to be a vehicle; and the acceleration detected by the first acceleration sensor being at or above the underride-mode-actuation determination threshold that is lower than the normal-actuation determination threshold.

In cases in which the vehicle collides with a comparatively light object, changes in the acceleration detected by the first acceleration sensor and the acceleration detected by the second acceleration sensor resemble those in the underride collision mode. There is therefore a possibility that the collision mode might be incorrectly determined to be the underride mode. In the first aspect of the present disclosure, even if the collision mode has been incorrectly determined to be the underride mode, the occupant restraint device is not actuated in cases in which the object with which the vehicle collides has not been determined to be a vehicle, since the conditions listed above have not been met. Accordingly, the first aspect enables unwanted actuation of the occupant restraint device to be suppressed in collisions that do not correspond to the underride collision mode.

A second aspect of the present disclosure is the vehicle collision detection system of the first aspect. The controller actuates the occupant restraint device in a case in which all of the following four conditions have been met within a predetermined duration: a first condition of a collision having been predicted by the collision prediction section; a second condition of the collision mode having been determined to be the underride mode by the determination section; a third condition of the object having been determined to be another vehicle by the determination section; and a fourth condition of an acceleration detected by the first acceleration sensor being at or above the underride-mode-actuation determination threshold.

In the second aspect, the occupant restraint device is actuated in cases in which each of the first condition to the fourth condition below have been met within a predetermined duration. The first condition is a condition of a collision having been predicted by the collision prediction section. The second condition is a condition of the collision mode having been determined to be the underride mode by the determination section. The third condition is a condition of the object having been determined to be a vehicle by the determination section. The fourth condition is a condition of an acceleration detected by the first acceleration sensor being at or above the underride-mode-actuation determination threshold. There is a high likelihood of the collision mode being the underride mode in cases in which the timings at which the first condition to the fourth condition are met fall within the predetermined duration, even if there is some variation in the timings at which respective conditions are met such that the times at which the respective conditions are met are not concurrent. The second aspect enables reliable actuation of the occupant restraint device in cases in which there is a high likelihood of the collision mode being the underride mode.

A third aspect of the present disclosure is the vehicle collision detection system of the first or second aspect. Detection for an object is repeated while a collision between the vehicle and the object is being predicted by the collision prediction section; and in a case in which a collision has been predicted by the collision prediction section and the object has been determined to be another vehicle, the determination section retains, for a predetermined duration, information regarding the object detected by the collision prediction section as other-vehicle information regarding the collision counterpart.

In the third aspect, the object is detected repeatedly while a collision between the vehicle and the object is being predicted by the collision prediction section. It is conceivable that while the collision between the vehicle and the object is being predicted by the collision prediction section, the collision prediction section may become unable to detect the object with which the vehicle has initially been predicted to collide as a result of, for example, a change in the distance between the vehicle and the object. However, in the third aspect, the determination section retains information regarding the object detected by the collision prediction section as vehicle information regarding the collision counterpart for the predetermined duration in cases in which a collision has been predicted by the collision prediction section and the object has been determined to be a vehicle. This thereby enables a situation in which the occupant restraint device cannot be actuated to be forestalled in cases in which an object with which the vehicle has been initially been predicted to collide becomes undetectable while the collision between the vehicle and the object is still predicted.

A fourth aspect of the present disclosure is the vehicle collision detection system of any one of the first to third aspect. The occupant restraint device is a pre-tensioner; and the controller determines whether or not the acceleration detected by the first acceleration sensor is at or above the underride-mode-actuation determination threshold, which is lower than a normal-actuation determination threshold for the pre-tensioner.

A fifth aspect of the present disclosure is the vehicle collision detection system of any one of the first to fourth aspect. The second acceleration sensor is provided on both a left and a right of a vehicle front section.

Unwanted actuation of the occupant restraint device can be suppressed in a collision that does not correspond to the underride collision mode.

What is claimed is:

1. A vehicle collision detection system comprising:
a collision prediction section that includes a first processor, a camera, and a radar device;
a memory; and
a second processor that is connected to the collision prediction section and the memory, and that is configured to:
in a case in which a collision between an object and a vehicle installed with an occupant restraint device has been predicted by the collision prediction section, determine whether or not a collision mode between the vehicle and the object is an underride mode based on an acceleration detected by a first acceleration sensor provided in a vehicle cabin and an acceleration detected by a second acceleration sensor provided further toward a vehicle front than the vehicle cabin, and determine whether or not the object is another vehicle; and
actuate the occupant restraint device in a case in which the collision between the vehicle and the object has been predicted by the collision prediction section, the collision mode has been determined to be the underride mode, the object has been determined to be the another vehicle, and the acceleration detected by the first acceleration sensor is at or above an underride-mode-actuation determination threshold that is lower than a normal-actuation determination threshold for the occupant restraint device,
wherein the first processor of the collision prediction section is configured to:
detect a position of the object in an image input from the camera based on information input from the radar device
extract feature quantities of the object, and
determine whether or not the object is the another vehicle based on the extracted feature quantities,
wherein the second processor is configured to actuate the occupant restraint device in a case in which all of the following four conditions have been met during a time duration less than a predetermined time duration:
a first condition of the collision having been predicted by the collision prediction section;
a second condition of the collision mode having been determined to be the underride mode by the second processor;
a third condition of the object having been determined to be the another vehicle by the second processor; and
a fourth condition of the acceleration detected by the first acceleration sensor being at or above the underride-mode-actuation determination threshold,
wherein the occupant restraint device is a pre-tensioner.

2. The vehicle collision detection system of claim 1, wherein:
object detection is repeated while the collision has been predicted by the collision prediction section and the object has been determined to be the another vehicle, the second processor retains, for a predetermined duration, information regarding the object detected by the collision prediction section as other-vehicle information regarding a collision counterpart.

3. The vehicle collision detection system of claim 1, wherein:
the second processor is configured to determine whether or not the acceleration detected by the first acceleration sensor is at or above the underride-mode-actuation determination threshold, which is lower than the normal-actuation determination threshold for the pre-tensioner.

4. The vehicle collision detection system of claim 1, wherein the second acceleration sensor is provided on both a left and a right of a vehicle front section.

5. A non-transitory recording medium storing a program executable by a computer to perform vehicle collision detection processing, the vehicle collision detection processing comprising:
in a case in which a collision between an object and a vehicle installed with an occupant restraint device has been predicted, determining whether or not a collision mode between the vehicle and the object is an underride mode based on an acceleration detected by a first acceleration sensor provided in a vehicle cabin and an acceleration detected by a second acceleration sensor provided further toward a vehicle front than the vehicle cabin, and determining whether or not the object is another vehicle; and
actuating the occupant restraint device in a case in which the collision between the vehicle and the object has been predicted, the collision mode has been determined to be the underride mode, the object has been determined to be the another vehicle, and the acceleration detected by the first acceleration sensor is at or above an underride-mode-actuation determination threshold that is lower than a normal-actuation determination threshold for the occupant restraint device,
wherein the method further comprises:
detecting a position of the object in an image input from a camera based on information input from a radar device,
extracting feature quantities of the object, and
determining whether or not the object is the another vehicle based on the extracted feature quantities,
wherein, in the vehicle collision detection processing, the occupant restraint device is actuated in a case in which all of the following four conditions have been met during a time duration less than a predetermined time duration:
a first condition of the collision having been predicted;
a second condition of the collision mode having been determined to be the underride mode:
a third condition of the object having been determined to be the another vehicle; and
a fourth condition of the acceleration detected by the first acceleration sensor being at or above the underride-mode-actuation determination threshold,
wherein the occupant restraint device is a pre-tensioner.

6. The non-transitory recording medium of claim 5, wherein, in the vehicle collision detection processing:
object detection is repeated while the collision between the vehicle and the object is being predicted; and
in a case in which the collision has been predicted and the object has been determined to be the another vehicle, information regarding the detected object is retained for a predetermined duration as other-vehicle information regard a collision counterpart.

7. The non-transitory recording medium of claim 5, wherein:
in the vehicle collision detection processing, determination is made as to whether or not the acceleration detected by the first acceleration sensor is at or above the underride-mode-actuation determination threshold, which is lower than the normal-actuation determination threshold for the pre-tensioner.

* * * * *